(12) United States Patent
Knowles et al.

(10) Patent No.: US 11,007,724 B2
(45) Date of Patent: May 18, 2021

(54) SKIN-TO-CORE BOND LINE MAPPING SYSTEM AND METHOD

(71) Applicant: Textron Innovations Inc., Providence, RI (US)

(72) Inventors: Kelly Knowles, Fort Worth, TX (US); Clyde Gibson, Denton, TX (US)

(73) Assignee: Textron Innovations Inc., Providence, RI (US)

(*) Notice: Subject to any disclaimer, the term of this patent is extended or adjusted under 35 U.S.C. 154(b) by 135 days.

(21) Appl. No.: 16/058,660

(22) Filed: Aug. 8, 2018

(65) Prior Publication Data

US 2020/0047428 A1 Feb. 13, 2020

(51) Int. Cl.

| | |
|---|---|
| *B29C 65/00* | (2006.01) |
| *B29C 70/44* | (2006.01) |
| *B32B 37/10* | (2006.01) |
| *B32B 37/12* | (2006.01) |
| *B29C 43/36* | (2006.01) |
| *B29L 31/30* | (2006.01) |

(Continued)

(52) U.S. Cl.
CPC .......... *B29C 66/97* (2013.01); *B29C 43/3642* (2013.01); *B29C 66/342* (2013.01); *B29C 66/81455* (2013.01); *B29C 66/952* (2013.01); *B29C 66/961* (2013.01); *B29C 70/44* (2013.01); *B29C 2043/3644* (2013.01); *B29C 2791/006* (2013.01); *B29L 2031/3076* (2013.01); *B32B 3/12* (2013.01); *B32B 7/12* (2013.01); *B32B 37/003* (2013.01); *B32B 37/1018* (2013.01); *B32B 37/1292* (2013.01); *B32B 41/00* (2013.01); *B32B 2307/724* (2013.01); *B32B 2309/68* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 5,897,739 A | * | 4/1999 | Forster .................. B29C 70/342 156/285 |
| 5,958,166 A | * | 9/1999 | Walters ................... B29C 73/04 156/94 |

OTHER PUBLICATIONS

"Experienced Aerospace Manufacturer Relies On Proven Methods," Composites World, Online references, Mar. 1, 2003. https://www.compositesworld.com/articles/experienced-aerospace-manufacturer-relies-on-proven-methods (Year: 2003).*

* cited by examiner

*Primary Examiner* — Christopher T Schatz
(74) *Attorney, Agent, or Firm* — Whitaker Chalk Swindle & Schwartz PLLC; Enrique Sanchez, Jr.

(57) ABSTRACT

A skin-to-core bond line mapping system and method is disclosed. Layered composite components formed by "sandwiching" multiple materials together require a continuous bond between those materials with voids below particular thresholds that can vary by application. The skin-to-core bond line mapping system can include a laminate, an adhesive, a separator film, a core, a breather, a layup tool, bagging material, sealant, and a vacuum port. By employing systems and processes that layer separator film over adhesive and applying a core proximate the adhesive, a bagging material can be disposed over the materials to facilitate vacuum compaction, thereby impressing core impressions on the adhesive to map the areas between the skin and core that have good contact. An iterative process is disclosed, in which additional adhesive can be used to build the bond line until contact is made (or engineering tolerance is reached).

12 Claims, 3 Drawing Sheets

(51) Int. Cl.
*B32B 3/12* (2006.01)
*B32B 7/12* (2006.01)
*B32B 37/00* (2006.01)
*B32B 41/00* (2006.01)

SKIN-TO-CORE BOND LINE MAPPING SYSTEM AND METHOD

BACKGROUND

1. Field of the Invention

The present invention is generally related to composite component void detection systems, and more specifically to systems and methods for mapping bond lines between composite components to detect and reduce voids.

2. Background of the Invention

Aircraft performance depends upon accurate structure and function of all components. The fine details and rigorous standards of components allows today's aircraft to be safe and reliable. One aspect of the construction of these aircraft components is the adhesion of various components into a single, streamlined, functional component. Many aircraft components are formed by bonding various components together. The components can be made of similar or different types of materials. The process by which components are attached to each other is held to higher tolerance to ensure that the safety and function of the aircraft is preserved. Specifically, fabrication of these aircraft components typically involves the bonding of metal with disparate materials, which can contain plastic, carbon, aramid, or fiberglass as reinforcement fiber. These aircraft components can also include a matrix resin, such as polyester, epoxy, polyimide, or bismaleimide. These materials can be bonded or joined together as laminates or sandwich structures.

The bond between a metal or laminate skin and a core is called a skin-to-core bond. Anytime two different materials are bonded together, there is the possibility of a void forming between the two materials. A void is an empty, unoccupied volume within the fiber/resin matrix or within a core splice or a potted area. The void can cause a possible point of failure such that it would not meet specifications or cause catastrophic damage. When two different components are bonded together, there is the possibility that a void between the two bonded materials could exist. The void could cause a possible point of failure or prevent satisfaction of specification requirements, potentially resulting in catastrophic damage. The number and/or size of voids must be kept within acceptable levels for particular applications. Previous solutions were no solution, in that, if voids were detected exceeding the requirement, the entirety of the composite material would be discarded, resulting in unnecessary waste and loss of pecuniary value.

When components include details, such as holes, contours, ridges, indentations, radii, bevels, or protrusions, it can be increasingly difficult to achieve an acceptable bond line between and/or around such details. Attempting to bond core around elements, such as holes, to meet that shape, can result in an unacceptable number of voids or unacceptable size of voids between the skin and the core trying to meet those curved surfaces for a radius. For example, a flat surface can have a machined imperfection in the core that requires a bond. Such imperfections could cause a void between the outer skin and the layer of material under the outer skin. That void could manifest itself as a point of failure.

In aerospace applications, a very small void size is allowable. Anything that flies is held to a higher tolerance level. Smaller defect limits can quickly manifest themselves in increased costs associated with these defects. Any components having voids greater than a few inches spread out over it, could result in scrapping of the entire component. When pre-cured skins are incorporated into the system, the raw materials are costly due mainly to the cost associated with curing the outer skin and any necessary details. Therefore, the scrapping of components due to voids can become staggering.

In traditional composite bonding systems, the adhesive is applied and the build process is executed without checking whether the voids were within acceptable limits prior to formation. Ultrasonic inspection techniques, merely determined whether the final product met the specifications or not. This approach adequately identifies the state of the final product, but does not reduce waste as those components not meeting the standard must undergo costly repairs, when allowable, or are discarded.

Other approaches utilized removable film to document skin-to-core contact. For example, in uncured panels, a sheet of Verifilm® could be disposed between two materials, compressed, and then removed to show any voids. However, such film has disadvantages as it is not part of the layup process, such that the voids cannot be filled to bring the component within specification tolerances, resulting in scrapping the component and additional waste.

SUMMARY

The present invention achieves technical advantages as a skin-to-core bond line mapping system and method. Layered composite components that are formed by "sandwiching" multiple materials together require a continuous bond between those materials with voids below particular thresholds that can vary by application. In order to ensure that the number of voids meet particular requirements, a skin-to-core bond line mapping system is disclosed. The skin-to-core bond line mapping system can include a laminate, an adhesive, a separator film, a core, a breather, a layup tool, bagging material, sealant, and a vacuum port. By employing systems and processes that layer separator film over adhesive and applying a core proximate the adhesive, a bagging material can be disposed over the materials to facilitate vacuum compaction, thereby impressing core impressions on the adhesive to map the areas between the skin and core that have good contact. An iterative process is disclosed, in which additional adhesive can be used to build the bond line until contact is made (or engineering tolerance is reached).

The present invention also troubleshoots in-process via a feedback loop to eliminate wasted materials. In the real world, every detail cannot be built perfectly, the present invention improves on prior techniques by compensating for imperfections that arise when a part is being formed. The blind building of components that contain defects is effectively replaced with an in-process solution that saves time and money, and results in a better bond line. A new build can take a week from start to finish. By applying the system and methods disclosed herein, a part can be corrected mid-process, to conform to exacting standards by simply adding another 15-20 minutes to the process.

One exemplary embodiment of the invention discloses a bond line mapping system including a composite material, an adhesive disposed proximate the composite material, a separator film disposed proximate the adhesive, and a core, having a plurality of edges configure to create indentation in the adhesive. A layup tool can be configured to maintain the contour of a surface. A perishable bond accessory (PBA) can be configured to place the core in a predetermined location and a bagging material is disposed over the composite material, the adhesive, the separator film, and the core, and removably attached to the layup tool via a sealant. A vacuum port can be disposed in the bagging material and can be operably coupled to a vacuum to facilitate vacuum compaction between the bagging material and the layup tool. The vacuum compaction causes the core to create impressions on the adhesive to map the areas between the composite material and the core that have direct contact. The system can also include a void sensor configured to identify voids in the adhesive. The void sensor can be an electronic light sensor, RADAR transceiver, an ultrasonic sensor, or other suitable sensor.

Another exemplary embodiment of the invention discloses a method for bond line mapping, including applying an adhesive to at least a portion of a part; disposing a separator film proximate the adhesive; positioning a PBA proximate the film to guide the placement of a core proximate the adhesive; disposing the core onto the film; disposing an airproof material to the part; covering the adhesive, film, core, & breather; creating a vacuum compaction between the airproof material and the part to impart markings on the adhesive by the core; removing the material and detecting a void using the markings in the adhesive; determining whether the void can be within a tolerance; and adding additional adhesive in the void to eliminate the void. The method can also include repeating the aforementioned steps until the void is within the tolerance or eliminated. The tolerance can be based upon the size of the void, or the void number.

Another exemplary embodiment of the invention discloses a method for bond line mapping, including applying an adhesive to at least a portion of a part; disposing a separator film proximate the adhesive; disposing the core onto the film; disposing the part, the adhesive, the film, and the core into an airproof bag; creating a vacuum within the bag to cause a compaction and impart markings on the adhesive by the core; and detecting a void using the markings in the adhesive. The method can further include determining whether the void is within a tolerance. The method can further include adding additional adhesive in the void to eliminate the void. The method can further include repeating the aforementioned steps until the void is within the tolerance. The tolerance can be based upon the size of the void or the void number. The method can further include positioning a perishable bond accessory (PBA) proximate the film to guide the placement of a core proximate the adhesive.

Other advantages will be apparent to those of ordinary skill in the art.

DETAILED DESCRIPTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
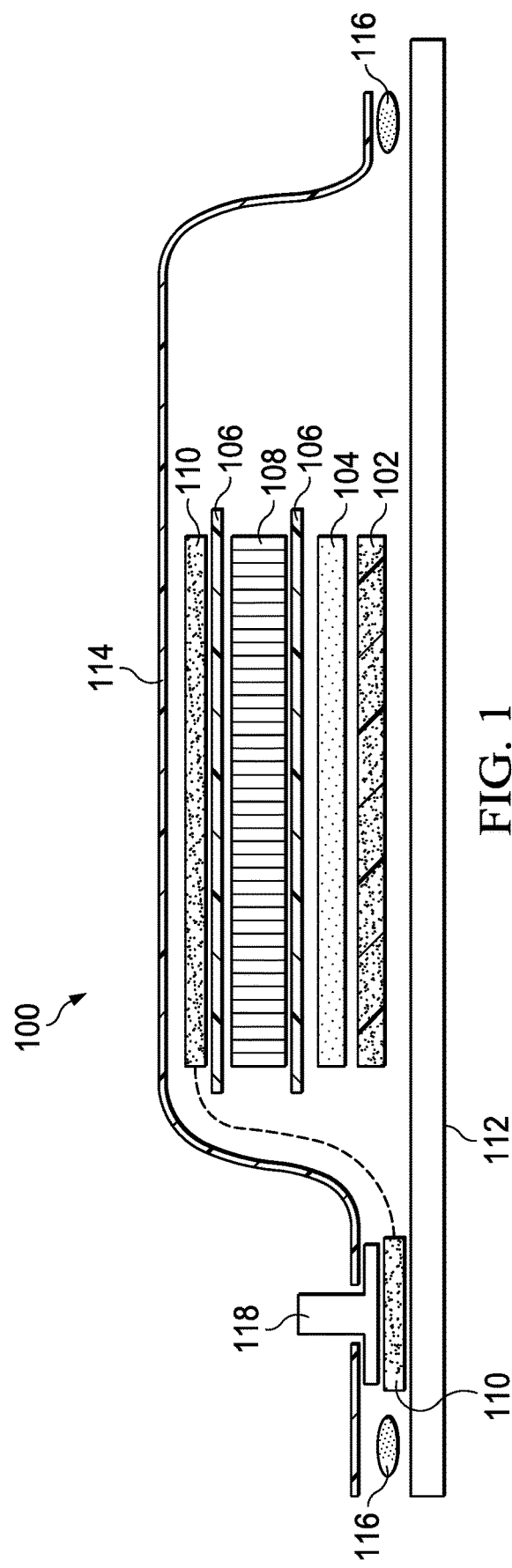
FIG. 1 is a cross-sectional view of an embodiment of the skin-to-core bond line mapping system, in accordance with the present invention.

FIG. 1 is a cross-sectional view of an embodiment of the skin-to-core bond line mapping system, designated generally as 100, in accordance with the present invention. Skin-to-core bond line mapping can be used to detect contact in almost any kind of layered (sandwich) composite. The system 100 can be utilized in applications that include composite or metal outer skins and a composite or metal detail in between the skins. The composite preferably includes a honeycomb core sandwich panel or an uncured blade. Alternatively, any suitable outer skin and any suitable core material can be used.

The skin-to-core bond line mapping system 100 can include a laminate 102, an adhesive 104, a separator film 106, core 108, breather 110, layup tool 112, bagging material 114, sealant 116, and vacuum port 118. The laminate 102 can be a pre-cured skin, plastic, carbon, aramid, fiberglass, or other suitable material.

The adhesive 104 is preferably a foaming adhesive that expands when cured, but any film adhesive that is thick enough to imprint could be applied. Alternatively, any suitable adhesive can be used. Any kind of film adhesive, whether a supported adhesive or non-supported adhesive is contemplated. A foaming adhesive is thicker, which gives distinct impressions that are easier to identify. Foaming adhesives have the added capability of filling a void because it expands. In film adhesives, which do not typically expand, additional adhesive layers must be placed in the void to fill the void. Foaming adhesives expand when it is cured, providing the potential, as it foams, to fill the void. However, in certain applications, the adhesive 104 can flow out of a panel as it migrates towards the vacuum path as it is heated and liquefied, which can result in thinning. Such thinning can increase the opportunity for a void to form at the location where adhesive 104 thinned. Regardless, the process disclosed below can account for such voids and effectively remove them.

The separator film 106 can be a polyolefin and/or fluorocarbon film used to prevent adhesion between two layers. The separator film 106 A fluoropolymer release film is preferably used to prevent adhesion of the adhesive 104 to the core 108 and also to prevent adhesion of the laminate to the breather layer. Alternatively, any suitable release film can be used. The purpose of the separator film is to keep the core 108 from sticking to the adhesive 104. The core 108 is preferably a honeycomb core panel made up of a plurality of reinforcement fibers disposed in a polymeric matrix. The reinforcement fibers of core 108 may comprise fibers comprising one or more of carbon, graphite, glass, metal (such as aluminum), an aromatic polyamide (i.e., "aramid") material, a variant of an aromatic polyamide material (e.g., a polyparaphenylene terephthalamide material), or the like. Alternatively, the core 108 can be an injection mold resin with chopped fibers or a pre-molded foam. The core 108 preferably includes a plurality of edges configured to create one or more indentations in the adhesive 104. Alternatively, the core 108 can include depressions or dimples, or other suitable feature that can impart an indentation on an adhesive 104.

The breather 110 can be used to maintain a "breather" path to the vacuum source, so that air and volatile can escape, and so continuous pressure can be applied to the laminate. Typically, a woven synthetic fiber cloth and/or heavy fiberglass fabric is used for this purpose. The breather layer usually extends past the edges of the layup so that the edge-band makes contact with the bleeder ply around the separator film. The layup tool 112 can be a tooling surface configured to maintain the contour of an engineered surface that the part will be built upon. A core locating tool or perishable bond accessory (PBA) (not shown) can be used to set the core 108 in a predetermined location. The core locating tool is preferably a carbon fiber picture frame that holds the core 108 in place. The core locating tool can include tooling pins on the frame, configured to hold the core 108 in the same place each layup. Alternatively, a laser location system can be used to project engineering lines on the plies such that the proper core 108 position can be determined.

The bagging material 114 can be any non-porous, airtight material. Alternatively, the bagging material 114 can be a bag. The bag can be sealed on three sides and sealant can be disposed along the open end of the bag to create an airtight seal on the fourth side. The bagging material 114 can include a vacuum port 118. The vacuum port 118 can be operably coupled to a vacuum. The vacuum can be configured with a regulator gage to pull a low vacuum, which is typically ten inches mercury or less. The low vacuum prevents the core 108 from being crushed upon compaction. The vacuum compaction duration is preferably fifteen minutes. However, other suitable pressures and/or times can be used dependent on the application and material type, such that the core 108 can impart impressions on the adhesive 104 without crushing the core. The sealant 116 can be elastic butyl tape, or any suitable sealant tape. The sealant 116 preferably includes adhesive on two-sides.

Figure 2A:
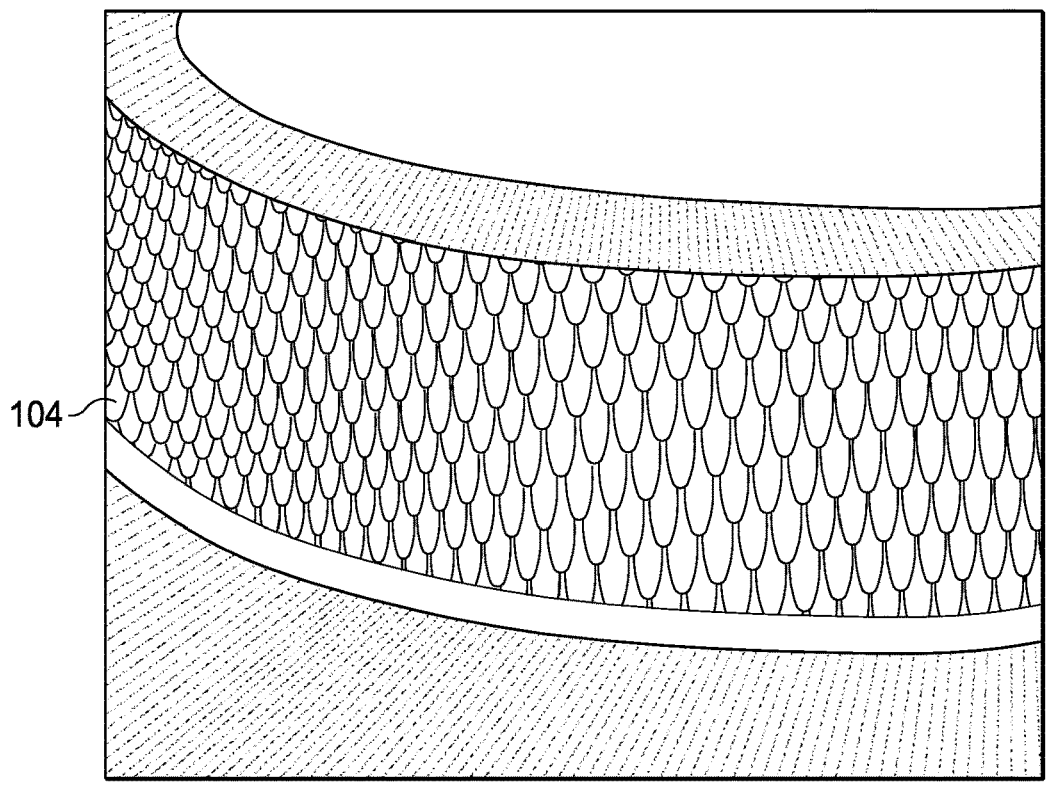
FIG. 2A is a perspective view of portions of an adhesive having continuous impressions, in accordance with the present invention.
Figure 2B:
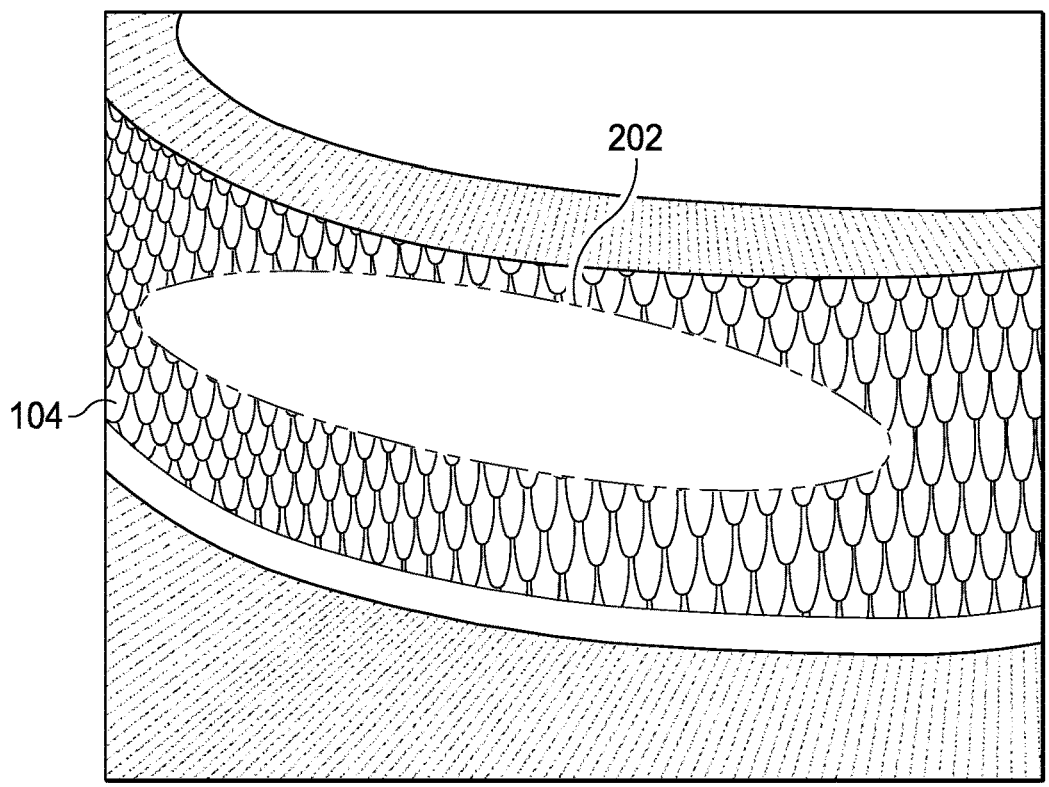
FIG. 2B is a perspective view of portions of an adhesive having voids in the impressions, in accordance with the present invention.

Referring to FIGS. 2A and 2B, there is shown in FIG. 2A, a perspective view of portions of an adhesive 104 having continuous impressions, in accordance with the present invention. After a room temperature vacuum compaction of a core 108 onto an adhesive 104, one or more indentations are created on the adhesive 104. In FIG. 2A, the skin-to-core mapping process does not reveal any voids and the part can proceed to the next step in the fabrication. In FIG. 2B, there is shown a perspective view of portions of an adhesive having voids in the impressions, in accordance with the present invention. In FIG. 2B, the skin-to-core mapping process reveals a void 202 in the adhesive 104, indicating that there may be a potential defect in the part after cure. Such void triggers the application of additional adhesive 104 in the void 202 and a re-mapping via the method disclosed below.

Figure 3:
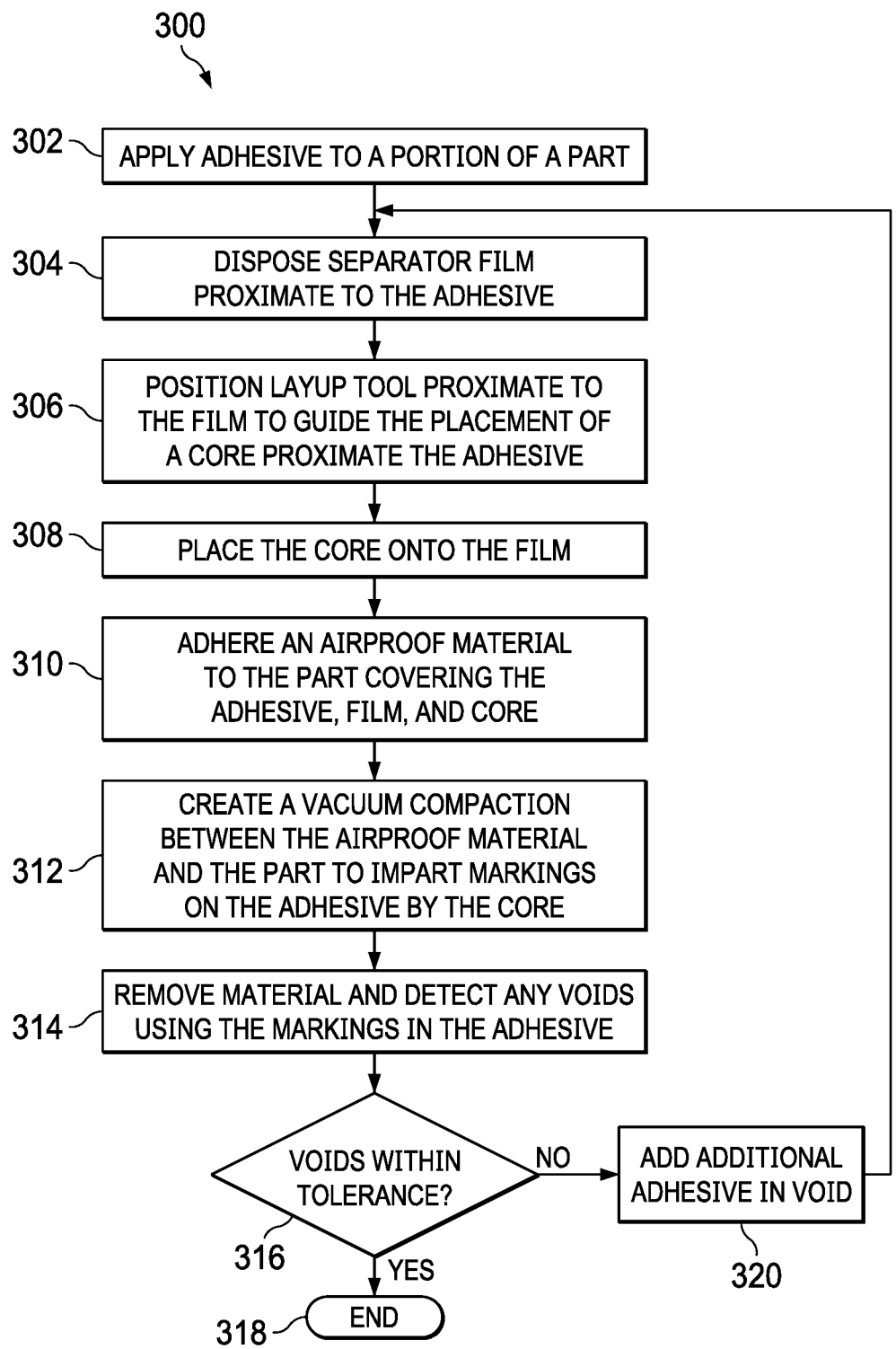
FIG. 3 is a flowchart of a skin-to-core bond line mapping and filling process, in accordance with the present invention.

FIG. 3 is a flowchart of a skin-to-core bond line mapping and filling process 300, in accordance with the present invention. The process 300 begins at 302, where an adhesive 104 is applied to at least a portion of a part. The part can be a laminate, skin, metal, or other suitable part capable of forming a void or defect. The process then proceeds to 304.

At 304, a separator film is disposed proximate to the adhesive 104. The separator film allows the disposition of a core, proximate the adhesive, without bonding the core to the adhesive. The method then proceeds to 306.

At 306, a layup tool is positioned proximate to the film, to guide the placement of a core proximate the adhesive. The proper placement of the core proximate the adhesive is critical, to ensure proper identification of any voids. The process then proceeds to 308.

At 308, the core is disposed onto the film. The process then proceeds to 310.

At 310, an airproof material is adhered to the part, covering the adhesive, film and core. The airproof material is preferably adhered to the part with a sealant. Any sealant capable of creating an airtight seal is contemplated. Alternatively, the airproof material can also be a bag, into which the part, adhesive, film and core can be placed. In such alternative embodiment, the sealant can be disposed along the open end of the bag to create an airtight seal. The airproof material preferably includes a vacuum port. The vacuum port 118 can be operably coupled to a vacuum. The process then proceeds to 312.

At 312, a room temperature vacuum compaction is created between the airproof material and the part to impart markings on the adhesive by the core. A vacuum can be preferably configured to pull a low vacuum, such as ten inches mercury or less for a period of fifteen minutes. A regulator can also be implemented on the vacuum, as there are variances between vacuums. Typical vacuum pressure is approximately 28 inches mercury. However, factors, such as altitude and horsepower can vary the vacuum pressure. However, other suitable pressures and/or times can be implemented dependent on the application and material type, such that the core can impart impressions on the adhesive. The process then proceeds to 314.

At 314, removing the material and detecting any voids using the markings on the adhesive. Voids can be detected via a void sensor. The void sensor can include an electronic light sensor, a RADAR transceiver, an ultrasonic sensor, or other suitable sensor for detecting a void. The void sensor is operably coupled to a processor and a memory for identification of a feature, according to methods known in the art. Other approaches, such as fluoroscopic/radiographic inspection, automated non-immersion ultrasonic system, tap testing, or visual inspection can also be utilized to detect a void. The voids can be measured and counted and stored for threshold analysis. The process then proceeds to 316.

At 316, it is determined whether the void is within a tolerance. Tolerances can be dictated by industry standards or customer specification, depending on the type or class of a part. Class allowables for a flight critical part can be based on size, such as area or length of a void, or void number, such as a maximum number of voids per area. Voids tolerances can be identified by placing measurement limitations on each void (such as predetermined unit of measure perpendicular and predetermined unit of measure parallel), by number of occurrence (such as no more than once per each predetermined unit of length), or by percentage (maximum total area not to exceed a predetermined percentage). The tolerances can also be divided into acceptable limits and correctable limits. Non-structural parts can be allowed a significantly bigger void. For example, in a structural part, the tolerance will typically be very small, as structural failure would result in catastrophic situations. If the void is within a predetermined tolerance or there are no voids, the process proceeds to 318. If the void is not within a predetermined tolerance, the process proceeds to 320.

At 318, the process ends and the part can continue to the next stage of fabrication, as any voids are within tolerance.

At 320, additional adhesive can be added in the void to eliminate the void. The surface area of the void, as measured in step 314, can be used to cut additional layers, which can be placed in the void to fill it, to the extent allowed. The aforementioned steps can be repeated until the void is within the predetermined tolerance. The method then proceeds to 304.

The present invention achieves at least the following advantages:
1. Significant cost savings by eliminating waste associated with the fabrication process;
2. Mapping the bond line between a skin and core prior to cure can help eliminate the risk of skin to core voids;
3. By using film or foaming adhesive and applying a layer of separator film (parting film) over the top, locating the core, and then performing a vacuum compaction you can map the areas between the skin and core that have good contact, thereby facilitating a smoother fabrication process;
4. This is an iterative process in which more adhesive can be used to build the bond line until contact is made (or engineering tolerance is reached), further eliminating waste of part components.

While the invention has been shown in one of its forms, it is not thus limited and is susceptible to various changes and modifications without departing from the spirit thereof. Persons skilled in the art will understand that this concept is susceptible to various changes and modifications, and may be implemented or adapted readily to other types of environments. Further, the individual elements of the claims are not well-understood, routine, or conventional. Instead, the claims are directed to the unconventional inventive concept described in the specification.

What is claimed is:

1. A method for bond line mapping, comprising: applying an adhesive to at least a portion of a part; disposing a separator film proximate the adhesive; positioning a layup tool proximate the film to guide placement of a core proximate the adhesive; disposing the core onto the film; disposing an airproof material to the part, covering the adhesive, the film, and the core; creating a vacuum compaction between the airproof material and the part to impart markings on the adhesive by the core; curing the adhesive with markings; removing the airproof material and detecting any void using the markings on the adhesive prior to the curing; and determining whether the void is within a tolerance.

2. The method of claim 1, further comprising adding additional adhesive in the void if the void is not within the tolerance.

3. The method of claim 1, further comprising repeating the aforementioned steps until the void is within the tolerance.

4. The method of claim 1, wherein the tolerance is based upon the size of the void.

5. The method of claim 1, wherein the tolerance is based upon the number of voids.

6. A method for bond line mapping, comprising: applying an adhesive to at least a portion of a part; disposing a separator film proximate the adhesive; disposing a core onto the film; disposing the part, the adhesive, the film, and the core into an airproof bag; creating a vacuum within the bag to cause a compaction and impart markings on the adhesive by the core curing the adhesive with the markings; and detecting any void using the markings in the adhesive prior to the curing.

7. The method of claim 6, further comprising determining whether the void is within a tolerance.

8. The method of claim 6, further comprising adding additional adhesive in the void to eliminate the void.

9. The method of claim 6, further comprising repeating the aforementioned steps until the void is within the tolerance.

10. The method of claim 6, wherein the tolerance is based upon the size of the void.

11. The method of claim 7, wherein the tolerance is based upon the number of voids.

12. The method of claim 6, further comprising positioning a layup tool proximate the film to guide the placement of the core proximate the adhesive.

* * * * *